United States Patent
Aono et al.

(10) Patent No.: US 7,836,758 B2
(45) Date of Patent: Nov. 23, 2010

(54) DETERIORATION DIAGNOSIS SYSTEM FOR AN AIR-FUEL RATIO SENSOR

(75) Inventors: Toshihiro Aono, Abiko (JP); Takahumi Ohwada, Tokyo (JP); Akira Kiyomura, Takasaki (JP); Masanobu Ohsaki, Maebashi (JP); Seiichi Ohtani, Maebashi (JP); Shigeo Ohkuma, Isesaki (JP)

(73) Assignee: Hitachi, Ltd., Tokyo (JP)

( * ) Notice: Subject to any disclaimer, the term of this patent is extended or adjusted under 35 U.S.C. 154(b) by 533 days.

(21) Appl. No.: 11/869,803

(22) Filed: Oct. 10, 2007

(65) Prior Publication Data
US 2008/0271435 A1 Nov. 6, 2008

(30) Foreign Application Priority Data
Oct. 11, 2006 (JP) ............................... 2006-277097

(51) Int. Cl.
*G01M 15/10* (2006.01)
(52) U.S. Cl. ................................ 73/114.72; 73/23.32
(58) Field of Classification Search ................ 73/23.31, 73/23.32, 114.69, 114.71, 114.72, 114.73
See application file for complete search history.

(56) References Cited

U.S. PATENT DOCUMENTS

| | | | | |
|---|---|---|---|---|
| 4,624,232 A | | 11/1986 | Saito et al. | |
| 5,212,947 A | * | 5/1993 | Fujimoto et al. | 60/276 |
| 6,347,544 B1 | * | 2/2002 | Hada et al. | 73/23.32 |
| 6,450,158 B2 | * | 9/2002 | Takahashi et al. | 123/681 |
| 6,868,712 B2 | * | 3/2005 | Hada et al. | 73/23.21 |
| 6,976,382 B2 | * | 12/2005 | Kadowaki et al. | 73/1.06 |
| 7,073,320 B2 | * | 7/2006 | Moritsugu et al. | 60/276 |
| 7,201,160 B2 | * | 4/2007 | Yoshiume et al. | 123/688 |
| 7,248,960 B2 | * | 7/2007 | Ikemoto et al. | 701/114 |
| 7,285,204 B2 | * | 10/2007 | Iida et al. | 205/784.5 |
| 7,631,550 B2 | * | 12/2009 | Mukai | 73/114.33 |
| 2001/0022176 A1 | * | 9/2001 | Takahashi et al. | 123/681 |
| 2004/0025856 A1 | * | 2/2004 | Iida et al. | 123/688 |
| 2007/0012086 A1 | * | 1/2007 | Ikemoto et al. | 73/23.32 |
| 2008/0028829 A1 | * | 2/2008 | Sawada et al. | 73/23.32 |

FOREIGN PATENT DOCUMENTS

| JP | 61-31640 A | 2/1986 |
|---|---|---|
| JP | 2003-20989 A | 1/2003 |

OTHER PUBLICATIONS

Japanese Office Action with partial Translation dated May 25, 2010 (Four (4) page).

* cited by examiner

*Primary Examiner*—Eric S McCall
(74) *Attorney, Agent, or Firm*—Crowell & Moring LLP

(57) ABSTRACT

A deterioration diagnosis system for an air fuel sensor mounted to an exhaust pipe of an internal combustion engine. The air fuel sensor determines a mixture ratio of air and fuel fed into the internal combustion engine. In the system, an inclination of an output signal of the air-fuel ratio sensor is calculated; variance of the inclination is calculated; deterioration of the air-fuel ratio sensor is determined based on the variance of the inclination.

8 Claims, 11 Drawing Sheets

DETERIORATION DIAGNOSIS SYSTEM FOR AN AIR-FUEL RATIO SENSOR

CLAIM OF PRIORITY

This application claims priority from Japanese application serial No. 2006-277097, filed on Oct. 11, 2006, the content of which is hereby incorporated by reference into this application.

BACKGROUND OF THE INVENTION

The present invention relates to a deterioration diagnosis system for an air-fuel ratio sensor to increase or decrease an output linearly in accordance with an air-fuel ratio of an internal combustion engine.

In a deterioration diagnosis system for an air-fuel ratio sensor applied to an internal combustion engine having an air-fuel ratio sensor for sensing an air-fuel ratio of emission gas, the system disclosed in Japanese laid-open patent publication No. 2003-20989 is comprised of: a fuel recovery operation detecting means for detecting that the engine is under a fuel recovery condition after fuel cut operation; a variation calculating means for calculating a variation of the air-fuel ratio in a predetermined variation calculating duration based on an output of the air-fuel ratio sensor every fuel recovery operation; a variation value determining means for comparing a maximum value of a plurality of variations calculated as described above with a predetermined judgment reference value and for determining abnormality when the maximum value is smaller than the predetermined judgment reference value.

SUMMARY OF THE INVENTION

Since the output variation of the air-fuel ratio sensor changes in accordance with duration times of the fuel cut, it is easy to perform abnormality diagnosis of the air-fuel ratio sensor with high accuracy if possible to take sufficiently a long fuel cut time. However, when a low speed and light load operation of an internal combustion engine continues for a long time, as the long fuel cut duration is not taken, abnormality diagnosis for the air-fuel ratio sensor with high accuracy becomes difficult. The conventional way has a problem on this view point.

Therefore, the present invention does not focus attention on the output variation of the air-fuel sensor during recovering from the fuel cut, and the present invention intends to diagnose a deterioration condition based on the output of the air-fuel ratio sensor in the steady state where the engine speed and load are maintained at nearly constant.

To accomplish the above intention, in the deterioration diagnosis system for diagnosing an air-fuel ratio sensor which is mounted to an exhaust pipe of an internal combustion engine for determining a mixture ratio of air and fuel fed into the internal combustion engine, the present invention configures the system as follows. That is, the deterioration diagnosis system is comprised of: a means for calculating an inclination of an output signal of the air-fuel ratio sensor; a means for calculating variance of the inclination; and a means for determining deterioration of the air-fuel ratio sensor based on the variance of the inclination.

Furthermore, the following system is proposed instead of the above-mentioned system. That is, the deterioration diagnosis system for an air-fuel sensor is comprised of: a means for calculating an inclination of an output signal of the air-fuel ratio sensor, a means for calculating variance of the inclination; a means for calculating variance of the output signal of the air-fuel ratio sensor; a means for normalizing the variance of the inclination by using the variance of the output signal of the air-fuel ratio sensor; and a means for determining deterioration of the air-fuel ratio sensor based on the normalized variance of the inclination.

Further, in two deterioration diagnosis systems for an air-fuel sensor described above, it is able to improve ever-more accuracy of the diagnosis by means of: correcting the variance or the normalized variance of the inclination of the air-fuel sensor output signal in accordance with an engine operation condition every obtaining the variance or the normalized variance; summing the corrected variances or the normalized variances obtained at predetermined times; and determining the air-fuel ratio sensor deterioration based on the calculated sum.

The present invention focuses attention on a matter in which the variance or the normalized variance of the inclination of the air-fuel ratio sensor output signal is reversely correlated to a period of feedback of an air-fuel ratio control. It makes possible to realize diagnosis of the deterioration for the air-fuel ratio sensor without changing the air-fuel ratio for diagnosis of the deterioration. Accordingly, it is possible to decrease discharge of harmful substances in emission gas during the deterioration diagnosis of the air-fuel ratio sensor.

DETAILED DESCRIPTION OF THE PREFERRED EMBODIMENTS

Hereinafter, an embodiment will be explained.

The First Embodiment

Figure 1:
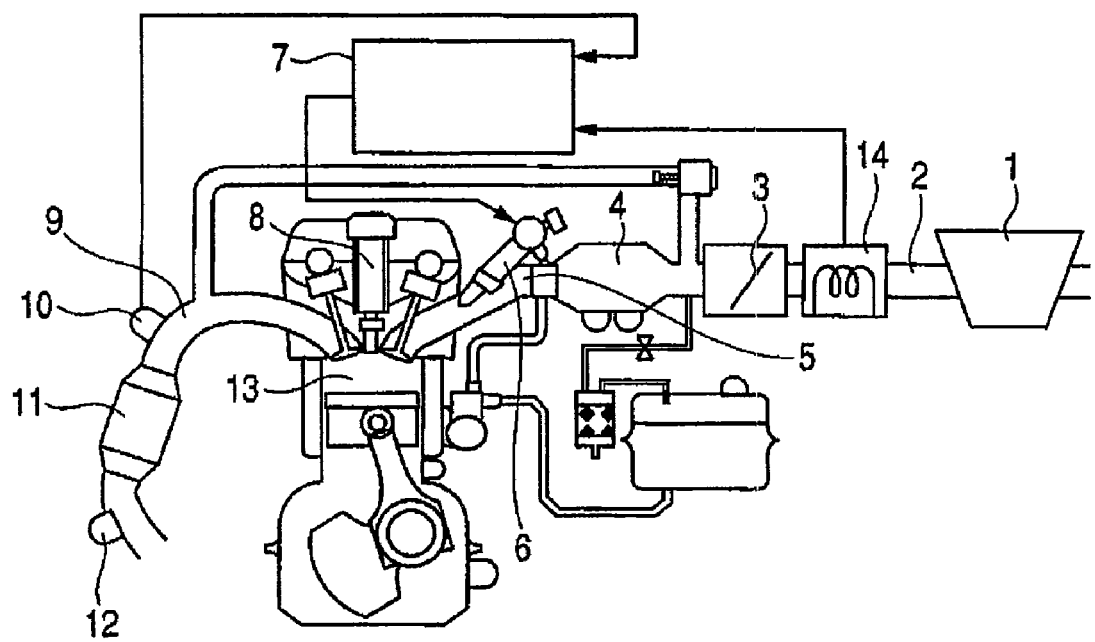
FIG. 1 is a structural view of an internal combustion engine in accordance with the present invention.
Figure 2:
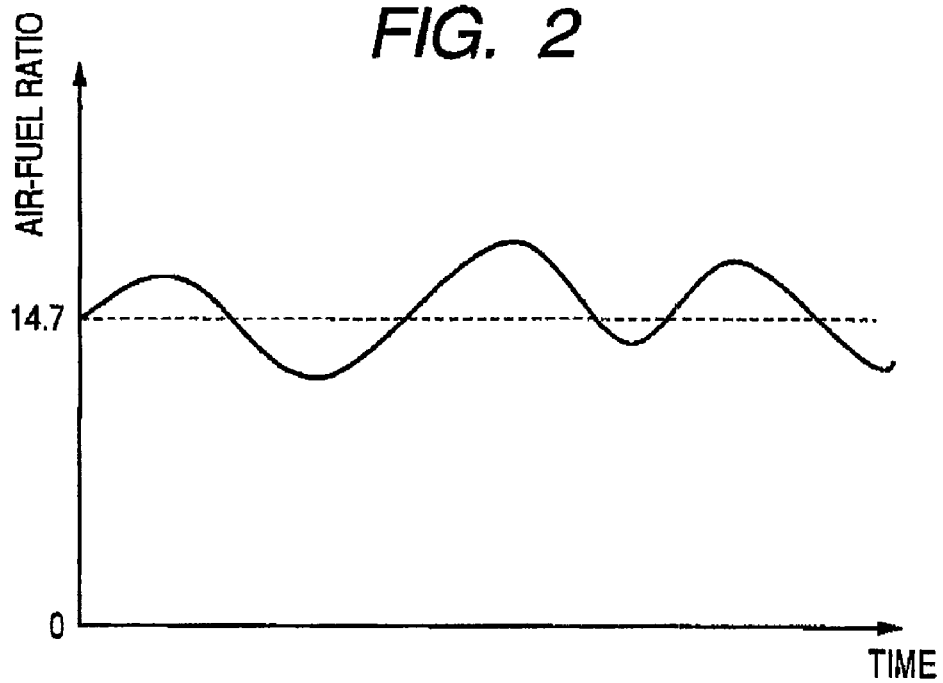
FIG. 2 is a view showing an example of a signal of an air-fuel ratio sensor.

FIG. 1 is a structural view of an internal combustion engine mounting a system of an embodiment according to the present invention. As shown in FIG. 1, an intake air of the internal combustion engine passes through an air cleaner 1, an air intake pipe 2, a throttle valve 3, a collecting pipe 4 and an intake manifold 5. The intake air is mixed with fuel injected from each fuel injector 6 mounted in the intake manifold 5. The mixture with a predetermined air-fuel ratio is fed into a cylinder 13. The mixture is ignited by an ignition plug 8 mounted on each cylinder 13 and burned to generate torque. After combustion, emission gas passes through an exhaust pipe 9, and after purification of harmful substances, such as carbon oxide CO, hydrocarbon HC, oxides of nitrogen NOx and the like with a three-way catalyst 11, is discharged to the atmosphere.

For burning the fuel with high efficiency and activating the three-way catalyst 11 to increase emission gas purification coefficient, it is necessary to maintain the air-fuel ratio of the mixture at stoichiometric air-fuel ratio 1:14.7. Accordingly, an intake air flow sensor 14 is mounted at the air intake pipe 2 to calculate an injected fuel quantity based on an air flow rate. However, if the air flow sensor 14 and the fuel injector 6 have errors, the air-fuel ratio differs from the target value. Therefore, the air-fuel ratio of the mixture is measured from the substances of emission gas with the air-fuel ratio sensor 10 disposed upstream of the three-way catalyst 11, and the engine controller 7 carries out feedback control to the fuel injection quantity from the fuel injector 6 so as to converse the measured air-fuel ratio to the target air-fuel ratio.

When the air-fuel ratio sensor 10 fails to output a normal signal due to cracks and connection failure, deterioration by lapse time and the like thereof, a feedback mechanism of the air-fuel ratio control does not operate properly. If leaving that state, the internal combustion engine will be operated with the air-fuel ratio deviation from the target value. If the injected fuel quantity becomes larger than the target value, the hydrocarbon is discharged and on the contrary, if the injected fuel quantity becomes smaller than the target value, the nitrogen oxides are discharged. This is not only disadvantage for an operator but also social disadvantage such as air pollution. Therefore, in the United States of America, regulation requires diagnosis function of the air-fuel ratio sensor 10 to the engine controller 7 and the same regulation will be introduced to Europe and Japan. An object of the present invention is to diagnose the deterioration of the air-fuel ratio sensor 12, due to mainly time lapsed changes.

When the air-fuel ratio becomes lean in the feedback control of the air-fuel ratio, the injection quantity of the fuel is controlled to be increased and when the air-fuel ratio becomes rich, the injection quantity of the fuel is controlled to be decreased. Due to this, the output of the air-fuel ratio sensor 10 oscillates with a stoichiometric air-fuel ratio 14.7 as center.

When the air-fuel ratio sensor 10 becomes deteriorated, it becomes less responsive, as a result, a period of feedback loop becomes long. The period of the feedback loop may be detected as oscillation period of the output signal from the air-fuel sensor 10, that is, oscillation period of the air-fuel ratio λ. Therefore, a concept of the present invention is to obtain an index having correlation to the period of the air-fuel ratio λ and diagnose deterioration of the air-fuel ratio sensor 10 by using this index. For example, when selected is an index having positive correlation to the period of the air-fuel ratio, its value increases with the increase of the oscillation period of the air-fuel ratio λ. Accordingly, since it may estimate that the period of the oscillation of the air-fuel ratio λ increases when the value of the index increases, the system is capable of diagnosing that the air-fuel ratio sensor 10 becomes deteriorated.

As an index having the correlation, for example, the following are obtained.

(1) Variance of inclination of the air-fuel ratio λ

(2) Ratio or difference between inclination variance of the air-fuel ratio λ and variance of the air-fuel ratio λ

Figure 3:
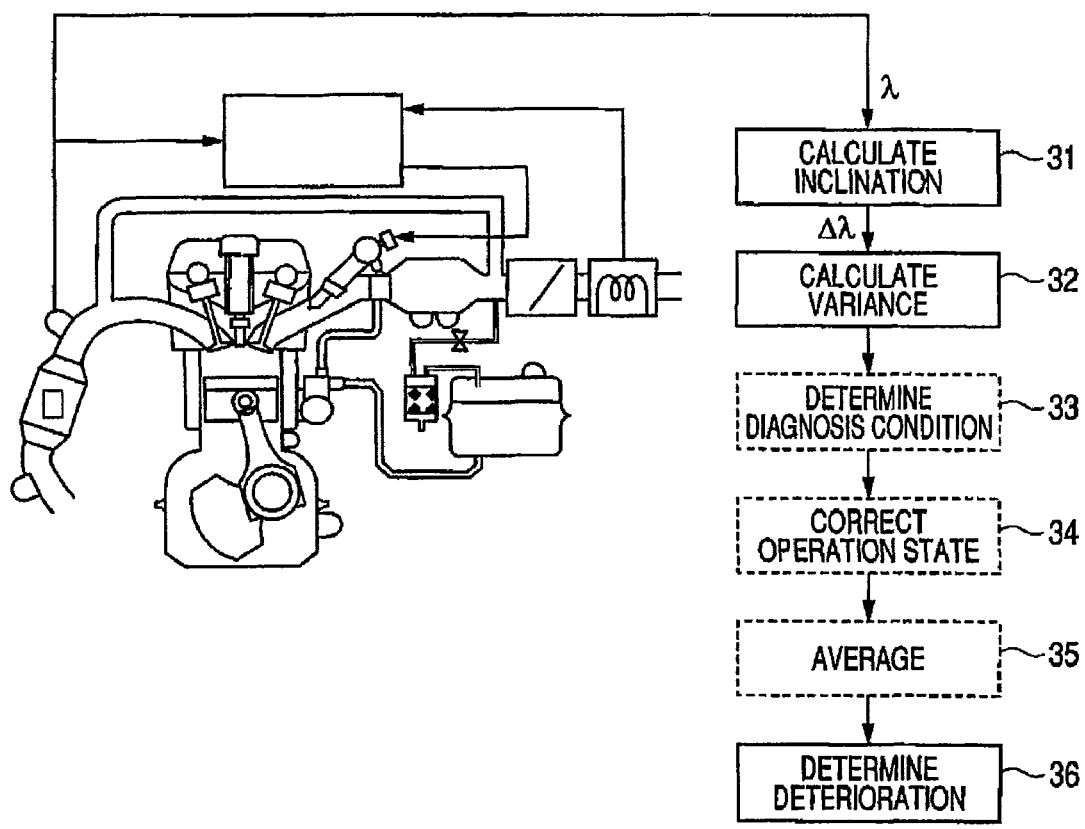
FIG. 3 is a structural view showing an example of the present invention.

(3) Ratio or difference between inclination variance of the air-fuel ratio λ calculated by obtaining difference in one time interval and inclination variance calculated by obtaining difference in other time interval As an example of the index having correlation, an example of structure of the present invention taking the inclination variance of the air-fuel ratio λ of (1) is shown in FIG. 3. The present example comprises an inclination calculating means 31 for obtaining inclination of the air-fuel ratio λ, a calculating means 32 for calculating variance s of inclination of the air-fuel ratio λ, and a means 36 for determining deterioration of the air-fuel ratio sensor based on the inclination variance s. Depending on the nature of the engine, a means 33 for making a go/no-go decision for diagnosis in accordance with an engine operation state, a means 34 for correcting the variance s in accordance with an engine operation state and a means 35 for averaging the corrected variance by the engine operation state, may be added to the structure of the present invention, as circled by broken lines in FIG. 3. By adding these means, diagnosis accuracy may be still further improved. As the present invention is carried out by using the engine controller 7, structure elements 31 to 36 may be considered as structural elements in the controller 7. Also, the present invention may be made independent of the engine controller 7 and one CPU is may be allotted to the deterioration diagnosis of the air-fuel ratio or engine on-board diagnosis function including this.

Figure 4:
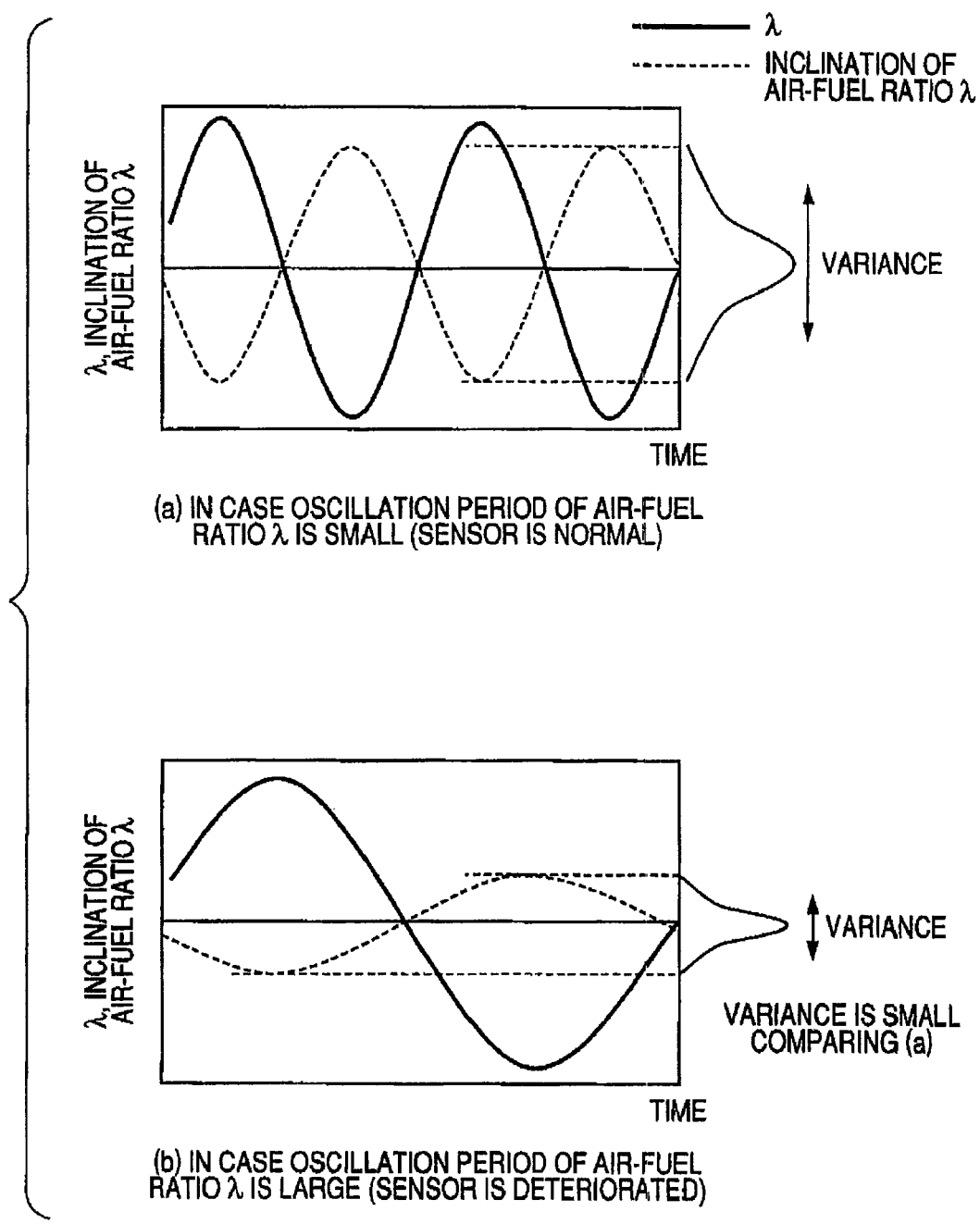
FIG. 4 is a view explaining influence on the amplitude of inclination of an air-fuel ratio sensor signal by a period of an air-fuel ratio.

The operation of the present invention is explained using FIG. 4. Wavy lines expressed by solid lines in FIGS. 4 (a) and 4(b) show an output of air-fuel ratio sensor. The solid line of FIG. 4 (a) shows the air-fuel ratio λ where the period of its variation is small and FIG. 4 (b) shows the air-fuel ratio λ where the variation period is large. As shown with the broken line in each of FIGS. 4 (a) and 4 (b), the inclination of the air-fuel ratio λ does not become so reduced when the variation period of the air-fuel sensor is small, and the inclination of the same clearly becomes reduced when the variation period of the air-fuel ratio sensor is large. Even if amplitudes of the air-fuel ratio λ in FIGS. 4 (a) and 4 (b) are almost same, as the amplitude of inclination of the air-fuel ratio λ of the large period (b) becomes smaller than that of the small period (a).

When the air-fuel ratio λ at time t is expressed using amplitude "a" and period T as Equation (1), the inclination is obtained by Equation (2).

$$\Lambda = a \times \sin(2pt/T) \qquad (1)$$

$$d\lambda/dt = (2pt/T) a \times \cos(2pt/T) \qquad (2)$$

As the period T of variation of the air-fuel ratio λ is large, amplitude of the inclination considerably becomes reduced. This is a reason why the magnitude of the inclination of the air-fuel ratio λ becomes small when the period of oscillation of the air-fuel ratio λ becomes large.

Therefore, in the case of the air-fuel ratio sensor becomes deteriorated, the oscillation period of the air-fuel ratio λ becomes large in comparison with that in the normal state of the air-fuel ratio sensor, and the amplitude of the inclination of the air-fuel ratio λ calculated by the inclination calculating means becomes small, as a result, the variance of the inclination becomes small. Therefore, in the basis of this phenomenon, the system can determine that the air-fuel ratio sensor becomes deteriorated when the inclination variance is smaller than a certain reference value.

Figure 5:
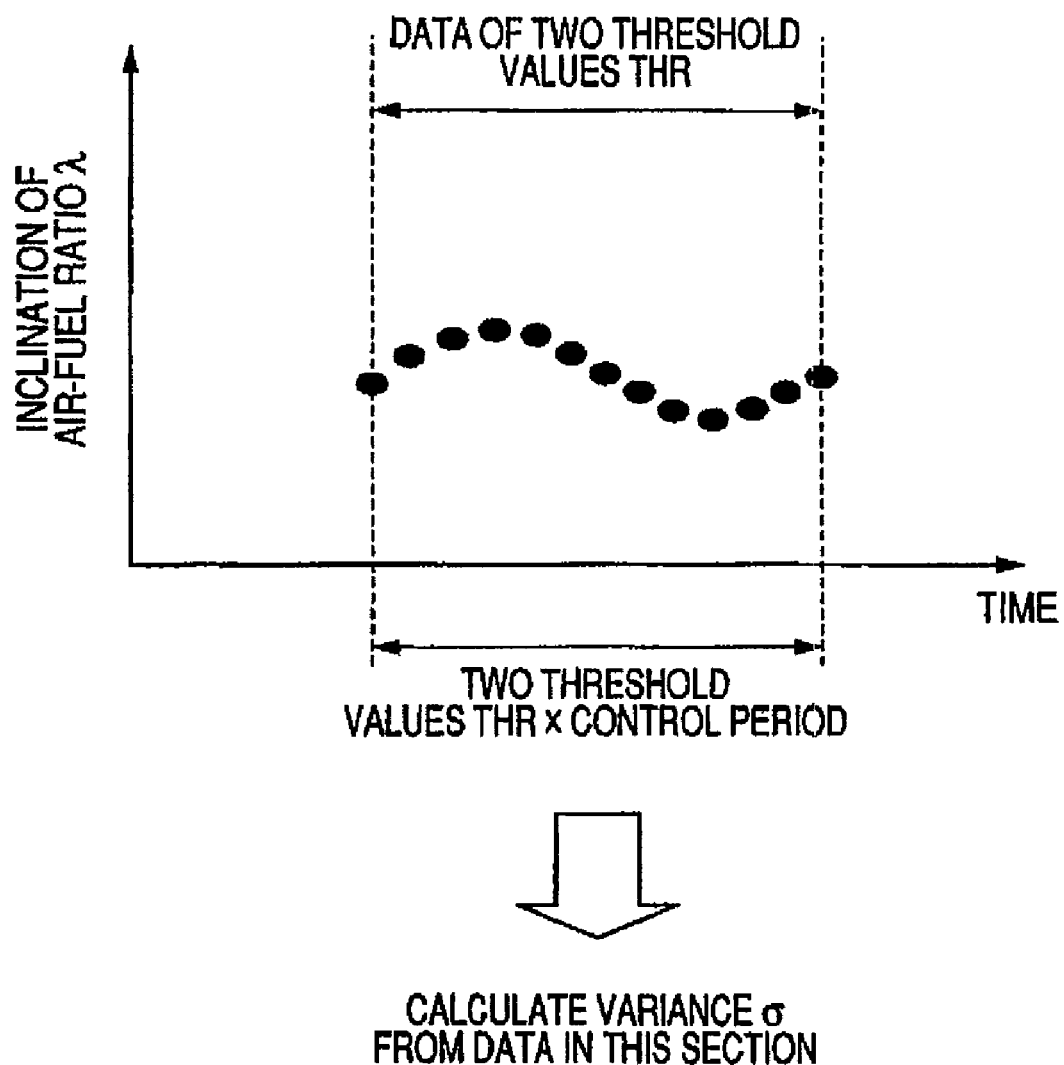
FIG. 5 is a view explaining calculation range of variance of inclination of the air-fuel sensor output signal, namely the variance obtained by a calculating means according to the present invention.
Figure 6:
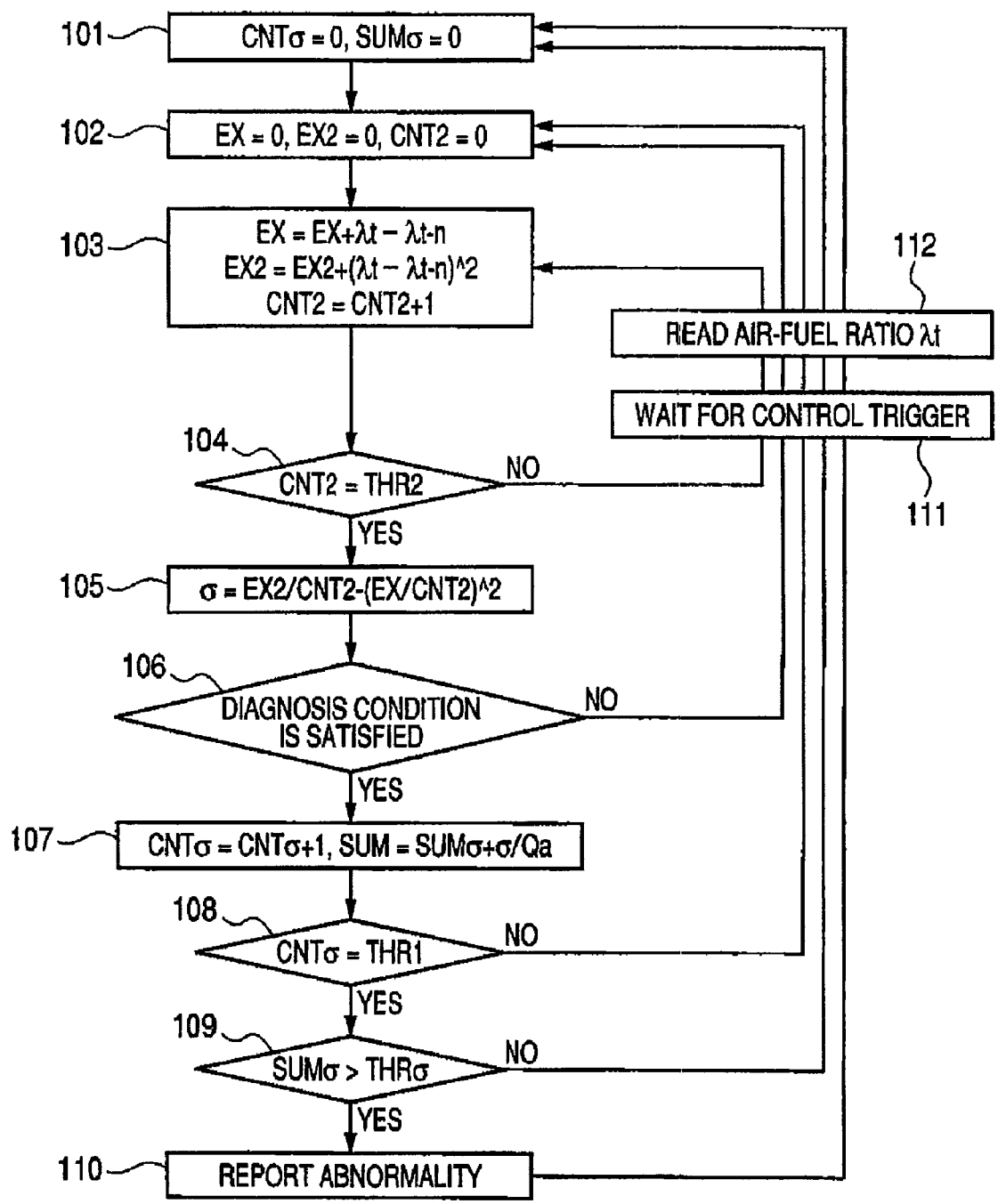
FIG. 6 is a view explaining an example processing procedure in an embodiment according to the present invention.

The operation of this embodiment will be explained using a time chart shown in FIG. 5 and a flow chart as shown in FIG. 6.

This program starts simultaneously at the engine starting and continues to carry out until the engine stops.

In this program, the inclination variance of the air-fuel ratio λ is calculated at time intervals of (two THRs×control period) as shown in FIG. 5. That is, it is calculated through inclinations of the air-fuel ratio λ of two THRs. The variance s is corrected with the engine operation state, for example, corrected by being divided by the air flow rate Qa. The corrected variance is obtained every control period. When sum s of the corrected variances at a predetermined times exceeds the threshold value THR s, the air-fuel ratio sensor is determined as abnormality. The inclination variance of the air-fuel ratio λ is obtained from steps 102 to 105 in FIG. 6 and summed after correction with the engine operation at a step 7. When the sum of the corrected variances at the predetermined times is obtained, the sum is determined whether or not the sum exceeds the threshold value THR s. As a result of that, detection of the presence or absence as to the abnormality of the air-fuel ratio sensor is carried out.

Next, each step of the flow chart of FIG. 6 is explained as follows.

Firstly, at starting of the engine, the total number CNTs of calculation for variances of the inclination of the air-flow ratio sensor output signal and sum value SUMs of the variances are initiated (step 101).

Steps 2 to 5 are parts for obtaining the variance. The inclination of the air-fuel ratio λ at a certain time point t is given with a value (λt−(λt−n)) that subtracts the air-fuel ratio (λt−n) before control period "n" from the value λt of the air-fuel ratio λ at the time point t. The number "n" is appropriately determined beforehand by the experiment so as to be sufficient performance in diagnosing deterioration of the air-fuel ratio sensor. The variance of the inclination (λt−(λt−n)) of the air-fuel ratio λ is calculated by the following equation.

$$\text{Variance} = \text{average of } (\lambda t - (\lambda t - n))^{\wedge}2 -$$
$$\{\text{average of } (\lambda t - \lambda t - n)\}^{\wedge}2$$
$$= \text{sum of } (\lambda t - (\lambda t - n))^{\wedge}2/\text{the number of data} -$$
$$\{\text{sum of } (\lambda t - (\lambda t - n))/\text{the number of data}\}$$

After that, at a step 102, sum value EX of inclinations, sum EX2 of square of inclination of the air-fuel ratio λ and the number of data CNT2 are initialized.

At a step 103, every control period, current the inclination (λt−(λt−n)) of the air-fuel ratio λ and the square thereof are added to EX and EX2 respectively and "1" is added to the counter CNT2 of the number of data. At a step 104, the system determines whether or not the number of data reaches a predetermined data number THR 2 and if reached, at a step 105, calculates variance s and if not at a step 111, waits for next control period and executes a step 103.

After the calculation of the variance υ at a step 105, at a step 106, the system determines whether the diagnosis condition is satisfied or not. If the diagnosis condition is satisfied, at a step 107, variance s is corrected with the engine operation state and added to the sum value SUMs of the corrected variances and "1" is added to CNTs.

At a step 108, the system determines whether or not the CNTs reaches a set value THR, and if reached, at a step 109, the system determines whether or not the sum values SUMs exceeds the threshold value THRs. If the total value SUMs exceeds the threshold value, the system determines that the air-fuel ratio sensor is abnormal an reports it at step 110. If not exceed, the system waits for the next interrupt at step 111, reads the next air-fuel ratio signal λt at step 112 and returns to a step 101.

As explained above, the flow processing is carried out as shown in FIG. 6 with the deterioration diagnosis system for an air-fuel ratio sensor having a structure shown in FIG. 3. Thereby, the system is capable of diagnosing the deterioration of the air-fuel ratio sensor without influence on the emission gas.

The Second Embodiment

By the way, according to the above-mentioned example of deterioration diagnosis system of the air fuel ratio based on the inclination variance of the air-fuel ratio λ, proper deterioration diagnosis of the air-fuel ratio λ is performed when the amplitude of the air-fuel ratio λ is stable with an acceptable level. However, it will be considered that the amplitude of the air-fuel ratio λ varies depending on the engine speed and load. In this case, with correcting the variation of the amplitude of the air-fuel ratio λ, it is desired to extract an index correlating to only the period of oscillation of the air-fuel ratio sensor as possible. Therefore, as an index having an aforementioned correlation (2), "ratio or the difference between the inclination variance of the air-fuel ratio λ and the variance of the air-fuel ratio λ" is selected. This is realized by adding a means 71 for calculating the variance of the air-fuel ratio λ and a means 72 for normalizing by dividing the inclination variance of the air-fuel ratio λ by the variance of the air-fuel ratio λ into the structure of the embodiment shown in FIG. 3. Thereby it is possible to determine the deterioration of the air-fuel ratio from the normalized inclination variance of the air-fuel ratio λ.

Validity of correcting the inclination variance of the air-fuel ratio λ with the variance of the air-fuel ratio λ may be explained as below.

When a signal of the air-fuel ratio sensor is assumed as Equation (3), variance s of the inclination thereof is obtained by Equation (4).

$$\lambda = a \times \sin(2pt/T) \quad (3)$$

$$s = \int (2pt/T)^2 a^2 \times \cos^2(2pt/T) dt \quad (4)$$
$$= (2pt/T)^2 a^2 \int \cos^2(2pt/T) dt$$

The variance of the air-fuel ratio λ is also obtained by Equation (5).

$$s\lambda = \int a^2 \times \sin^2(2pt/T) dt = a^2 \times \int \sin^2(2pt/T) dt \quad (5)$$

Equation (6) is led from Equation (3) to (5).

$$\int \cos^2(2pt/T) dt = \int \sin^2(2pt/T) dt \quad (6)$$

Furthermore, normalized value snorm of the inclination variance is obtained as Equation (7).

$$snorm = (2pt/T)^2 \quad (7)$$

The normalized variance snorm does not depend on the amplitude "a" of the sensor signal and is inversely proportional to the square of the period of the sensor signal. That is, when the air-fuel ratio sensor is deteriorated and the sensitive thereof becomes lowered, feedback period of the air-fuel ratio control becomes long, as a result, the normalized variance becomes small. Therefore, deterioration of the air-fuel sensor may be diagnosed by the following Equations (8) and (9).

$$\text{snorm} = \text{threshold value} \rightarrow \text{normal} \quad (8)$$

$$\text{snorm} < \text{threshold value} \rightarrow \text{deterioration} \quad (9)$$

Figure 8:
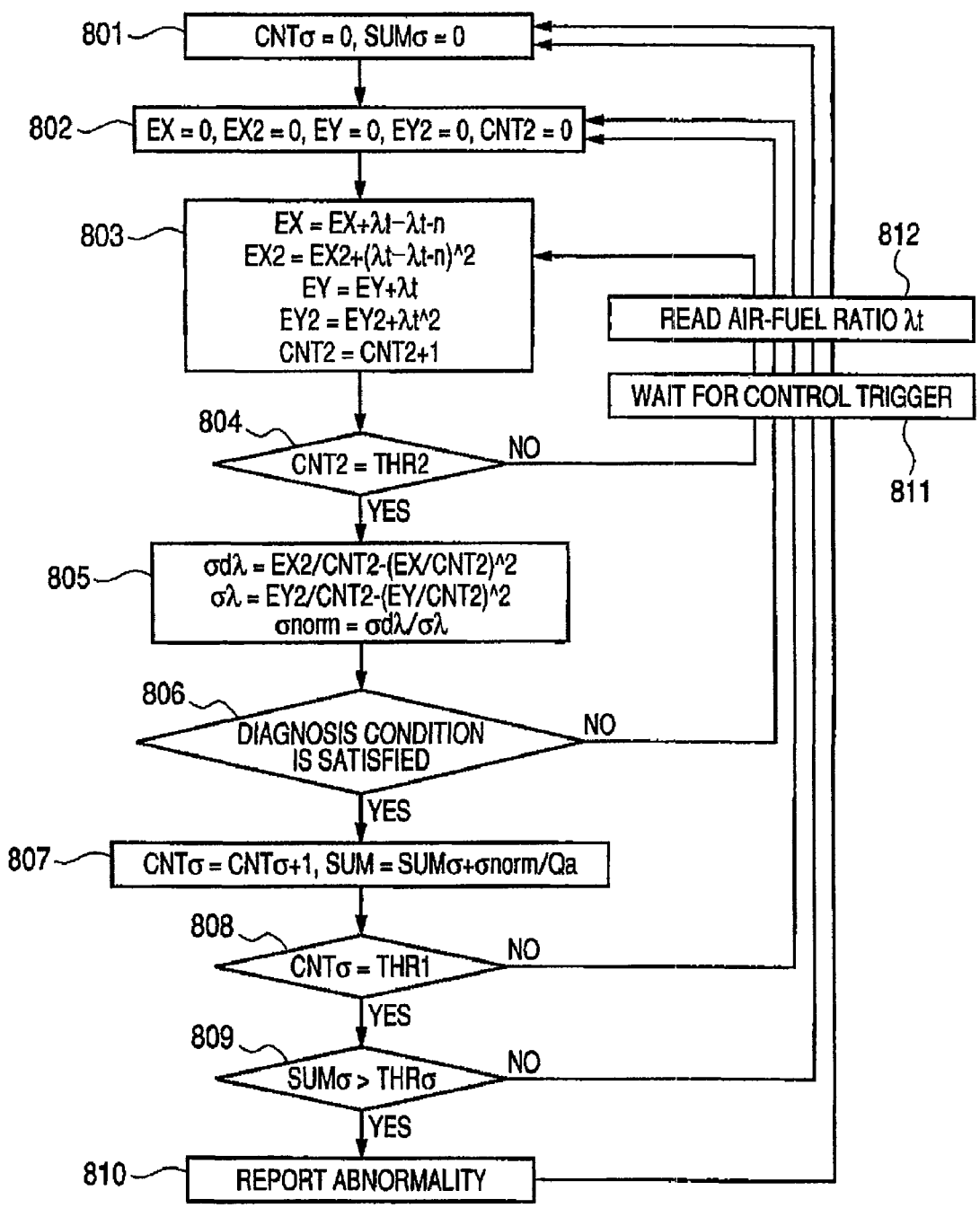
FIG. 8 is a view explaining processing procedure in the present invention.

A flow chart of an embodiment correcting the inclination variance of the air-fuel ratio by the variance of the air-fuel ratio λ is shown in FIG. 8. FIG. 8 corresponds to the flow chart described above in the embodiment shown in FIG. 5 and steps exception for steps 802, 803 and 805 are the same as that corresponding to the steps in FIG. 5.

In steps 802 to 805, in addition to the variance sdλ of the inclination of the air-fuel ratio λ, the variance sλ of the air-fuel ratio λ is also calculated, and the variance sdλ of the air-fuel ratio λ is corrected with variance sλ. At the step 802, in addition to sum EX of sdλ and the squared sum EX2, sum EY of the variance sλ of the air-fuel ratio λ and the squared sum EY2 are initialized.

In the step 803, every control period, current inclination of the air-fuel ratio (λt−(λt−n)) of the air-fuel ratio λ and its square are added to EX and EX2, and "1" is added to the counter CNT2 of the number of data, and the current value of the air-fuel ratio λt of the air-fuel ratio λ and its square are added to EY and EY2.

In the step 805, both of sdλ of the air-fuel ratio λ and sλ of the air-fuel ratio λ are obtained, and the normalized inclination variance snorm of the air-fuel ratio λ is calculated by taking a ratio of them.

After that, the aforementioned flow shown in FIG. 5 is carried out. That is, the normalized inclination variance snorm is corrected with operation state of the engine as requited, after that, summing of the predetermined times of the corrected inclination variances (step 807), when the sum is lower than the threshold value, the system determines that the air-fuel ratio sensor becomes deteriorated at a step 809.

According to the way described above it is possible to diagnose deterioration the air-fuel ratio sensor without influence on the emission gas.

The Third Embodiment

In the second embodiment, the inclination variance is normalized with the variance of the air-fuel ratio λ to prevent influence on amplitude of the air-fuel ratio λ by the engine operation state. Instead of that, the present embodiment prevents the influence on the amplitude of the air-fuel ratio λ by other way.

The inclination of the air-fuel ratio λ is obtained by difference of λ in a certain time interval. However, the amplitude of the inclination of the air-fuel ratio λ is varied by changing the time interval and the variance of the inclination of the air-fuel ratio λ is also varied according thereto.

The air-fuel ratio λt time t is expressed by equation (10) using amplitude "a" and period T.

$$\lambda t = a \times \sin(2pt/T) \quad (10)$$

Inclination of the air-fuel ratio λ, which is obtained from difference of λ in the control period "m", is expressed by the following Equation (11).

$$d\lambda/dt(m) = (\lambda t - (\lambda t - m))/m\Delta \quad (11)$$
$$= [a \times \sin(2pt/T) - a \times \sin\{2p(t-m)/T\}]m\Delta$$
$$= a \times \sin(p\ m/T) \times \cos\{p(2t-m)/T\}/m\Delta$$

The inclination of the air-fuel ratio λ obtained difference of λ in the control period "n" is expressed by Equation (12).

$$d\lambda/dt(n) = (\lambda t - (\lambda t - n))/n\Delta \quad (12)$$
$$= [a \times \sin(2pt/T) - a \times \sin\{2p(t-n)/T\}]n\Delta$$
$$= a \times \sin(p\ n/T) \times \cos\{p(2t-n)/T\}/n\Delta$$

Accordingly, ratio of the inclination of the air-fuel ratio λ obtained by difference in the control period "m" and the variance of inclination obtained by difference in the control period "n" is shown as Equation (13).

$$[d\lambda/dt(m)]/[d\lambda/dt(n)] = [\sin(pm/T)]/[\sin(pn/T)] \times [\cos\{p(2t-m)/T\}/\cos\{p(2t-n)/T\} \times n/m] \quad (13)$$

If the time intervals "m" and "n" are sufficiently smaller than period T, it may be is approximated as Equation (14).

$$[d\lambda/dt(m)]/[d\lambda/dt(n)] \approx [\sin(pm/T)]/[\sin(pn/T)] \times n/m \quad (14)$$

Figure 9:
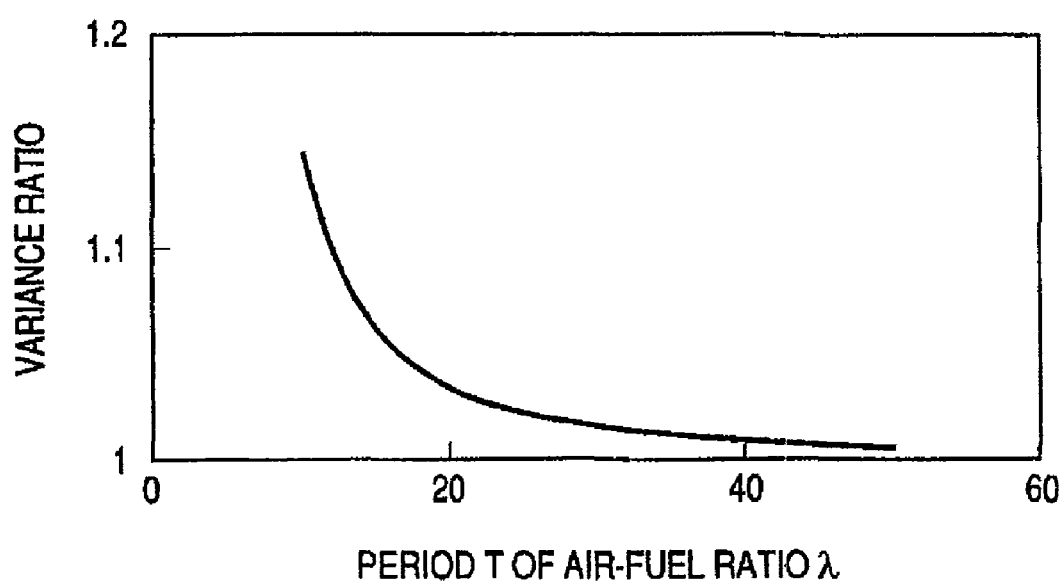
FIG. 9 is a view explaining relation between amplitude of an air-fuel ratio sensor output signal and diagnosis parameter according to the present invention.

When using these Equations, relationship between variance ratio at m=1 n=3 and the period of the air-fuel ratio λ is shown as FIG. 9. According to FIG. 9, it will be clearly found that a ratio of variance of the air-fuel ratio λ calculated by obtaining difference in the control period "m" and the variance of the inclination calculated by obtaining difference in the control period "n" has a negative relationship with the period T of the air-fuel ratio λ. Therefore, when the ratio is smaller than a threshold value, the period of the air-fuel ratio λ is larger than a certain value, and it may be capable of determining that the air-fuel ratio sensor is deteriorated.

Figure 10:
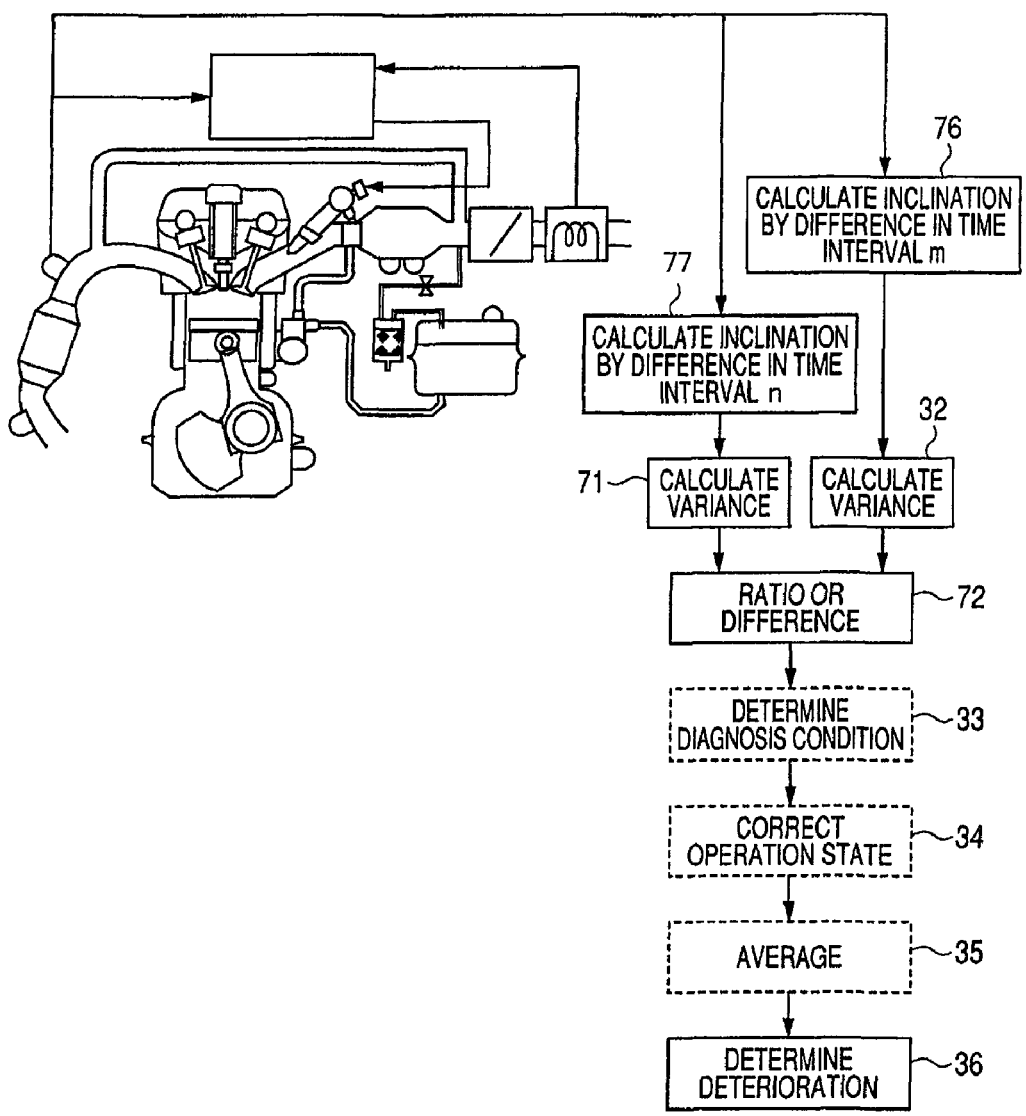
FIG. 10 is a view of an example of structure according to the present invention.

On the basis of a concept above, a structure of a deterioration diagnosing system is shown in FIG. 10 using ratio of the inclination variance of the air-fuel ratio λ calculated by obtaining difference in the time interval "m" and the inclination variance of the air-fuel ratio λ calculated by obtaining difference in the time interval "n".

Figure 7:
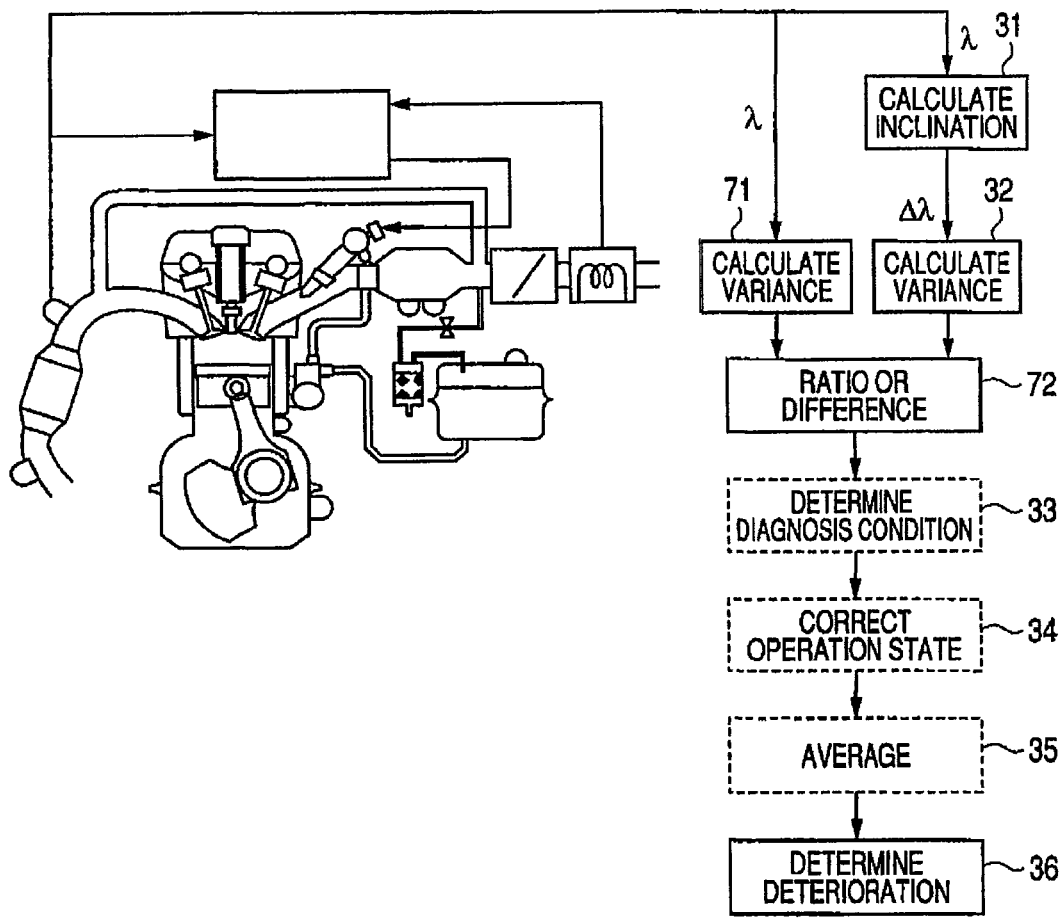
FIG. 7 is an example of the structural view in the present invention.

As shown in FIG. 7, in the system for diagnosing deterioration using the inclination variance value of the air-fuel ratio λ normalized by the variance of the air-fuel ratio λ, this is the deterioration diagnosis system which limits the inclination calculating means 31 to an inclination calculating means 76 obtaining difference in the time interval "m" and adds an inclination calculating means 77 obtaining difference in the time interval "n" arranged at the upstream of a variance calculating means 71.

Figure 11:
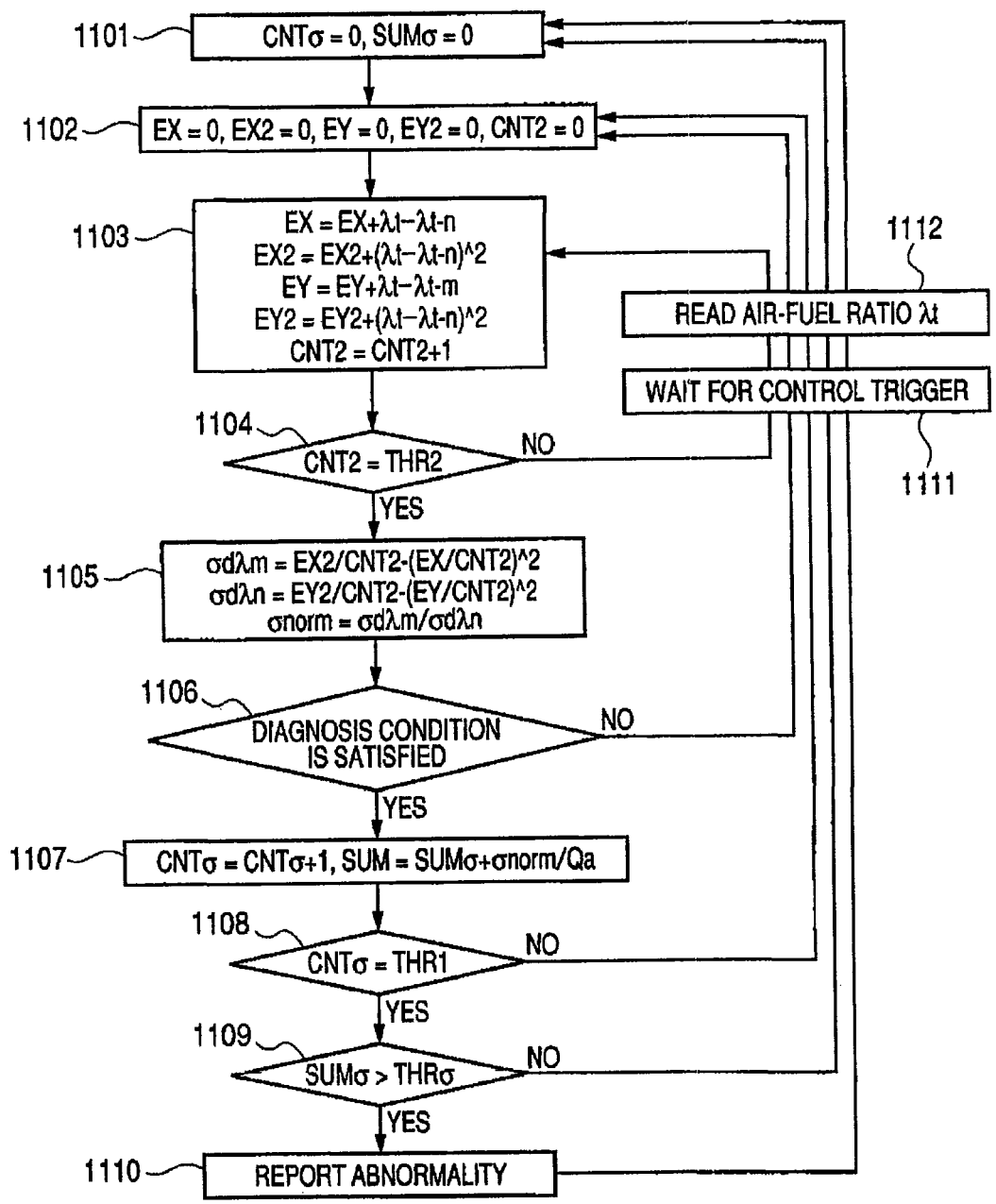
FIG. 11 is a view explaining a processing procedure of an embodiment according to the present invention.

A flow chart of the embodiment is shown FIG. 11. Steps 1101 to 1112 correspond to steps 801 to 812 of FIG. 8. The steps 802 to 805 obtain the inclination variance sdλ of the air-fuel ratio λ and the variances dλ of the air-fuel ratio λ. On the contrary, the steps 1102 to 1105 of FIG. 11 obtain the inclination variance sdλm of the air-fuel ratio λ obtained by difference in the time interval "m" of the air-fuel ratio λ and variance sdλn obtained by difference in the time interval "n". On other processing procedure, FIG. 8 in which diagnoses deterioration of the air-fuel ratio using a value of the inclination variance of the air-fuel ratio λ normalized with the variance of the air-fuel ratio λ is the same as FIG. 11 which diagnoses deterioration of the air-fuel ratio sensor using a ratio of the inclination variance of the air-fuel ratio λ calculated by obtaining difference in the control period "m" and the inclination variance of the air-fuel ratio λ calculated by obtaining difference in the control period "n".

As explained above, focusing attention on that the ratio of the inclination variance of the air-fuel ratio λ calculated by obtaining the difference in the control period "m" and the inclination variance of the air-fuel ratio λ in the control period "n" have a negative relationship, the system may be capable of diagnosing deterioration of the air-fuel ratio sensor through comparing this ratio with a threshold value.

The Fourth Embodiment

Figure 12:
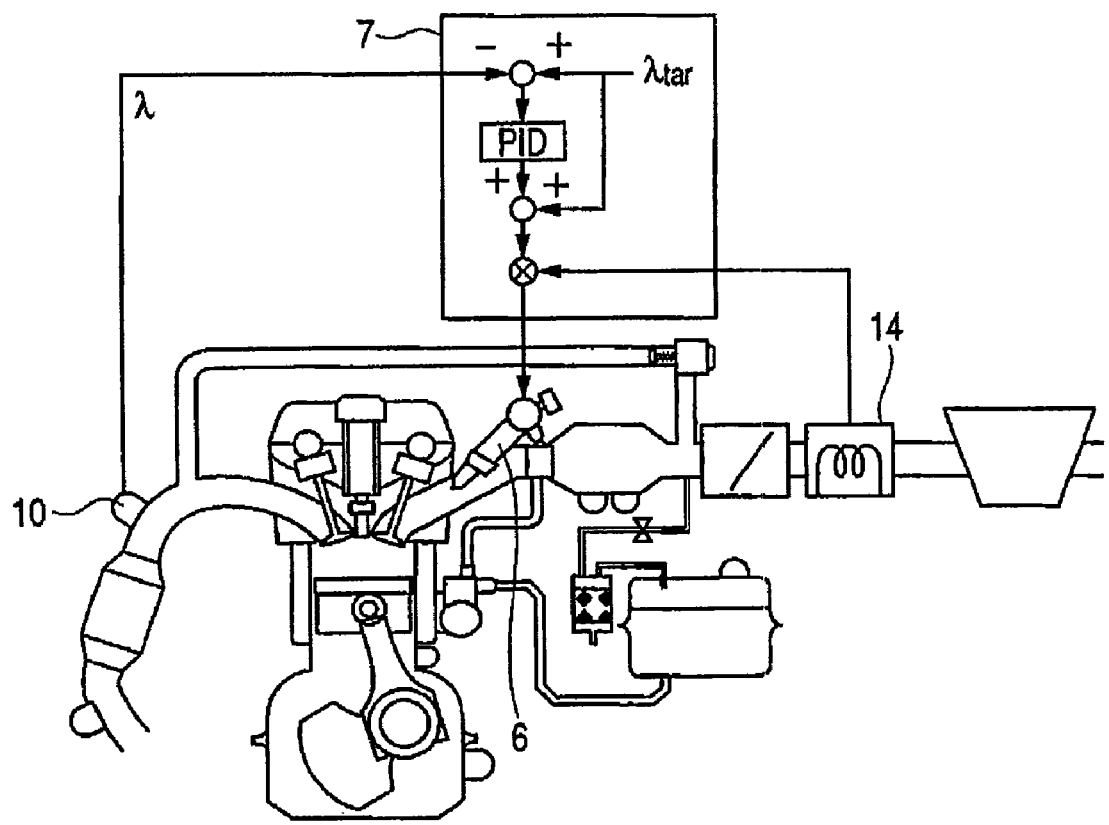
FIG. 12 is a view showing an example of an air-fuel ratio control method according to the present invention.

FIG. 12 shows an example way for controlling fuel quantity injected by the fuel injector 6 based on the air-fuel ratio λ output by the air-fuel ratio sensor 10. Here, air-fuel ratio correction quantity λc is calculated by a PID control so as to follow a target air-fuel ratio λtar, and intake air flow rate Qa measured by an intake air flow sensor 14 is multiplied by λc to calculate the fuel injection quantity Tp.

If the PID control is only a proportional control with the gain P, the following equation (15) holds.

$$Tp=Qa \times \lambda c=Qa \times [\lambda tar+P(\lambda tar-\lambda)] \qquad (15)$$

Since a variation period of intake air flow rate Qa, the target air-fuel ratio λtar and the proportional gain P are long in comparison with the period of oscillation of the air-fuel ratio λ, the following Equation (16) holds between the inclination variance s(dTp) of Tp and the inclination variance s(dλ) of the air-fuel ratio λ.

$$s(dTp)=(Qa \times P)^2 \times s(d\lambda) \qquad (16)$$

Accordingly, even if the inclination variance of the command value Tp to the fuel injector is used in place of the inclination variance of the air-fuel ratio λ, the first embodiment is operable sufficiently.

As same way as described above, the second and third embodiments are operable even if the air-fuel ratio λ is replaced by a command value Tp to the fuel injection system.

What is claimed is:

1. A deterioration diagnosis system of an air fuel ratio sensor mounted to an exhaust pipe of an internal combustion engine for determining a mixture ratio of air and fuel fed into the internal combustion engine, comprising:
    a means for calculating an inclination of an output signal of the air-fuel ratio sensor,
    a means for calculating variance of the inclination, and
    a means for determining deterioration of the air-fuel ratio sensor based on
    the variance of the inclination
    wherein the inclination variance of the output signal of the air-fuel ratio sensor is corrected in accordance with the internal combustion engine operation condition, the corrected variances obtained at predetermined times are summed, and the air-fuel ratio sensor deterioration is determined based on the calculated sum.

2. A deterioration diagnosis system of an air fuel ratio sensor according to claim 1, wherein the output signal from the air-fuel ratio sensor is replaced by an instruction value to a fuel injection system.

3. A deterioration diagnosis system for an air fuel sensor mounted to an exhaust pipe of an internal combustion engine for determining a mixture ratio of air and fuel fed into the internal combustion engine, comprising:
    a means for calculating an inclination of an output signal of. the air-fuel ratio sensor,
    a means for calculating variance of the inclination,
    a means for calculating variance of the output signal of the air-fuel ratio sensor,
    a means for normalizing the variance of the inclination by using the variance of the output signal of the air-fuel ratio sensor; and a means for determining deterioration of the air-fuel ratio sensor based on the normalized variance of the inclination.

4. A deterioration diagnosis system of an air fuel ratio sensor according to claim 3,
    wherein the normalized inclination variance of the output signal of the air-fuel ratio sensor is corrected in accordance with the internal combustion engine operation condition, the corrected normalized variances obtained at predetermined times are summed, and the air-fuel ratio sensor deterioration is determined based on the calculated sum.

5. A deterioration diagnosis system of an air fuel ratio sensor according to claim 3, wherein the output signal from the air-fuel ratio sensor is replaced by an instruction value to a fuel injection system.

6. A deterioration diagnosis system of an air fuel sensor according to claim 3, wherein if deterioration is determined, the system informs an operator of the deterioration by turning on an indicator lamp.

7. A deterioration diagnosis system for an air fuel sensor mounted to an exhaust pipe of an internal combustion engine for determining a mixture ratio of air and fuel fed into the internal combustion engine, comprising:
    a means for calculating two inclinations of an output signal of an air-fuel ratio sensor by obtaining differences of the output signal in different time intervals;
    a means for calculating variance of each inclination; and
    a means for calculating a ratio of these variances of the output signals of the air-fuel ratio sensor, thereby determining deterioration of the air-fuel ratio sensor based on the ratio of the variances of the output signals.

8. A deterioration diagnosis system of an air fuel sensor according to claim 7,
    wherein a ratio of two inclination variances of the output signals of the air-fuel ratio sensor is corrected in accordance with the engine operation condition, the corrected ratios obtained at predetermined times are summed, and the air-fuel ratio sensor deterioration is determined based on the calculated sum.

* * * * *